June 18, 1940.  F. A. PARSONS  2,204,693

TRANSMISSION AND CONTROL MECHANISM

Filed Sept. 9, 1937  5 Sheets-Sheet 1

INVENTOR
Fred G Parsons

June 18, 1940.  F. A. PARSONS  2,204,693

TRANSMISSION AND CONTROL MECHANISM

Filed Sept. 9, 1937  5 Sheets-Sheet 2

INVENTOR
Fred G. Parsons

June 18, 1940.  F. A. PARSONS  2,204,693
TRANSMISSION AND CONTROL MECHANISM
Filed Sept. 9, 1937   5 Sheets-Sheet 3

INVENTOR
Fred A Parsons

June 18, 1940.  F. A. PARSONS  2,204,693

TRANSMISSION AND CONTROL MECHANISM

Filed Sept. 9, 1937  5 Sheets-Sheet 4

INVENTOR
Fred G Parsons

Fig. 10.

Patented June 18, 1940

2,204,693

UNITED STATES PATENT OFFICE 2,204,693

TRANSMISSION AND CONTROL MECHANISM

Fred A. Parsons, Milwaukee, Wis., assignor to The Falk Corporation, Milwaukee, Wis., a corporation of Wisconsin Application September 9, 1937, Serial No. 162,977

18 Claims. (Cl. 90—21)

This invention relates to transmission and control mechanism, more particularly for machine tools.

For many transmission uses, it is desirable to provide a transmission in which a rate changer may be operated over a wide range of speeds while avoiding steps or gaps in the available intermediate speeds, in other words to have available any speed within the range of the rate changer. A purpose of the invention is to provide a stepless rate changer in an improved transmission combination, and particularly for machine tools.

A further purpose is to provide a stepless rate changer of friction type together with means for varying the pressure between frictionally engaged elements of the rate changer in accordance with load being transmitted through the elements, and especially in a machine tool transmission.

A further purpose is to provide a transmission in combination with improved means responsive to variations in the torque being transmitted, and in a manner such that the torque variations may be utilized for control of various functions of the transmission such, for example, as the mutual pressure between engaged friction members of the rate changer, the clutches, the reversers etc., or the control of mechanism for the shifting of clutches, reversers etc. at predetermined torque loading, and for various other control functions, as will hereafter appear, and particularly for a machine tool transmission.

A further purpose is to provide an improved transmission mechanism including alternatively available branch lines, one of which provides stepless rate change means, and in a form particularly adapted for preferred transmission and control effects and in combination with improved control mechanism, and particularly for machine tools.

A further purpose is to provide a transmission in an improved combination with control mechanism operative to retain the advantages of a strictly mechanical transmission while including certain desirable aspects normally associated only with a hydraulic transmission, and particularly for machine tools.

A further purpose is to provide a transmission including improved overload prevention means, particularly for machine tools, and more especially for milling machine table drives.

A further purpose is to provide an improved transmission for machine tools in which the direction and an alternative feed or quick traverse rate are determined by separate and individually operable mechanisms, and to provide improved control means therefor in which the controls for direction and for alternative feed or quick traverse rate are independently operable, but for certain purposes, such for instance as automatic reversal, the control of direction is interrelated or interconnected with the control for alternative feed or quick traverse rate, and particularly for the control of milling machine tables and similar purposes.

A further purpose is to effect an improved control for the main clutch of a machine tool, and particularly for the spindle clutch in a milling machine or similar machines, and to provide interconnection or interrelation of the main clutch control with other transmission and control mechanism of the machine tool, and especially where the controls provide for automatic reversal as indicated in the last preceding paragraph.

A further purpose is to provide an improved form of transmission control and shifter mechanism at least in part power operated, particularly where the control mechanism is initially manually operated, and the power shifting is hydraulic.

A further purpose is to provide an improved transmission mechanism and controls therefor which may be used for either manual or automatic control of relative movement of machine tool supports or similar purposes, or for movements involving both manual and automatic controls, and particularly for milling machines.

A further purpose is to provide an improved combination of reversing mechanism and control means therefor, and especially for reversal of relative movement between machine tool supports.

A further purpose is to provide an improved combination of reversing means and alternatively available controls therefor including a plurality of controls for automatic reversal respectively adapted for use under different working conditions such as may occur in machine tool operation, and particularly for milling machines.

A further purpose is generally to simplify and improve the construction and operation of machine tools, and particularly of milling machines, and especially for one or more of the purposes previously mentioned, and still other purposes will be apparent from the specification.

The invention consists of the construction and combination of parts as herein illustrated, described and claimed, and in such modification of the structure illustrated and described as may be the equivalent to the structure of the claims.

Throughout this specification the same reference characters have been used to indicate the same parts, and in the drawings.

Figure 1:
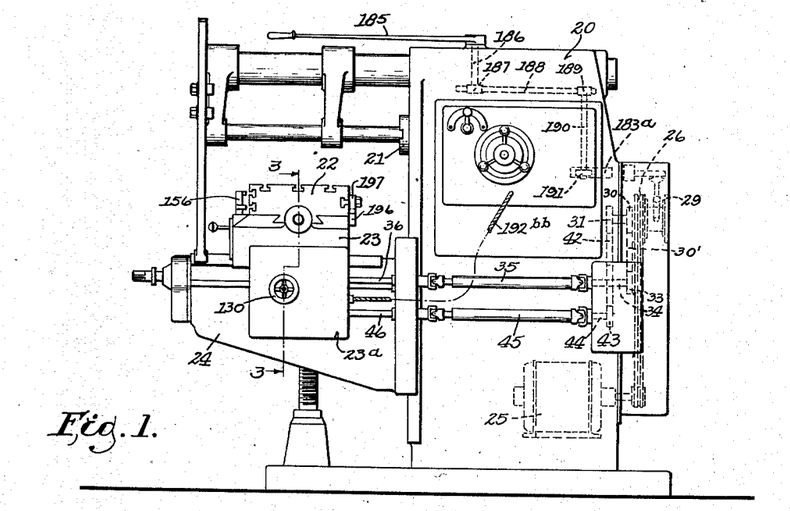
Figure 1 is a right side elevation of a milling machine in which the invention is incorporated.

The machine of Fig. 1 is a milling machine which includes a column 20, a tool spindle 21 rotatably supported on the column, and a work support or table 22 guided for movement on a saddle 23 in a direction transverse to the axis of the spindle, the saddle being supported for cross movement on a knee 24 which is vertically movable on the column. The knee, saddle and table together provide for table movement relative to spindle 21 in three mutually transverse paths.

The spindle 21, Fig. 1, is driven from a power source such as a motor 25, through a main clutch generally denoted by the numeral 26. The spindle transmission may be of any suitable type but in the present machine includes rate change and reversing mechanism of the form disclosed in my co-pending application Serial No. 126,779, filed February 20, 1937, and will not, therefore, here be described in detail. Clutch 26 may be engaged by the one direction of movement of a clutch hub 26a, Fig. 10. The other direction of movement of the clutch hub engages a brake, generally denoted by the numeral 29. A gear 30 is driven whenever the motor 25 is running, and forms the initial drive gear of a table quick traverse drive train later described. A gear 31 is driven only when clutch 26 is engaged, and forms the initial drive gear for a table feed rate train later described.

Figure 3:
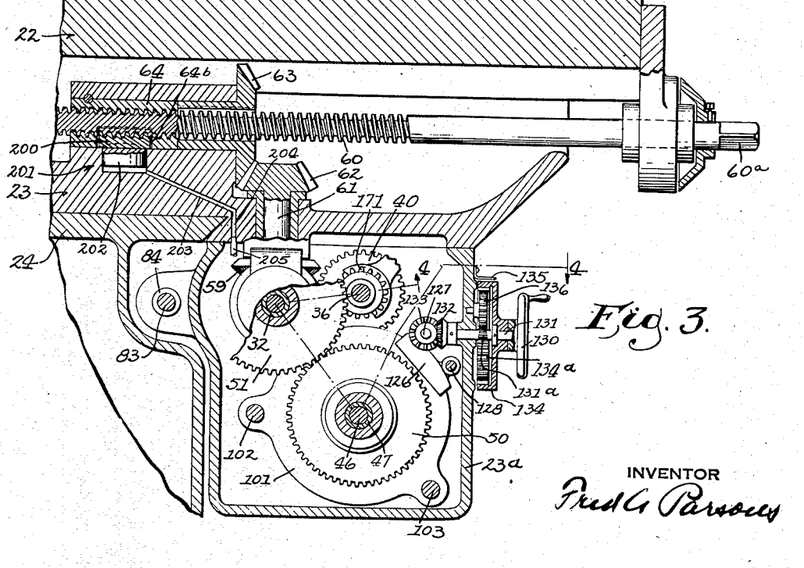
Figure 3 is a partial section taken approximately along the line 3—3 of Fig. 1, and enlarged.
Figure 4:
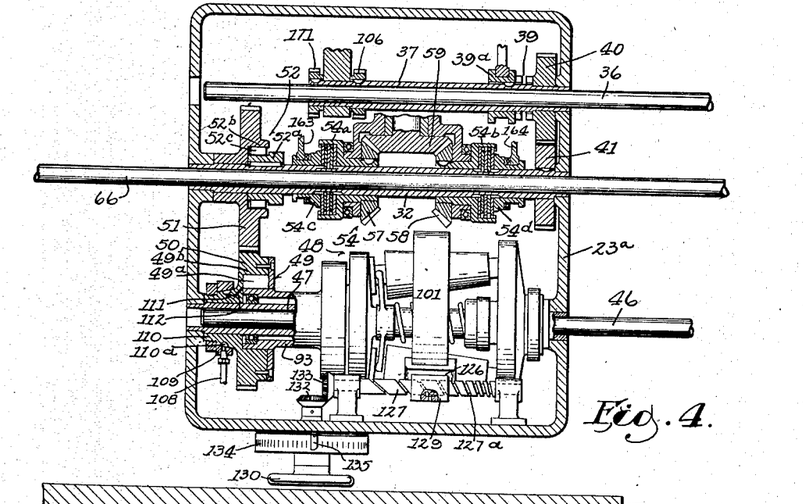
Figure 4 is a sectional development of transmission and other mechanism, taken approximately along line 4—4 of Fig. 3.

The feed and quick traverse trains just mentioned are alternatively connectible to drive a rotatable sleeve 32, Figs. 3, 4, carried in a box or housing 23a fixed on saddle 23. The quick traverse train includes the initial gear 30, an idler gear train 30', Fig. 1, a gear 33, a shaft 34, an extensible universal joint shaft device 35, a shaft 36, Figs. 1, 4, a sleeve 37 rotatably journaled in the housing 23a and slidably splined with shaft 36, a jaw clutch 39 which includes a shiftable member 39a, and gears 40, 41, which drive the sleeve 32 from clutch 39 but only when the clutch 39 is engaged.

Figure 8:
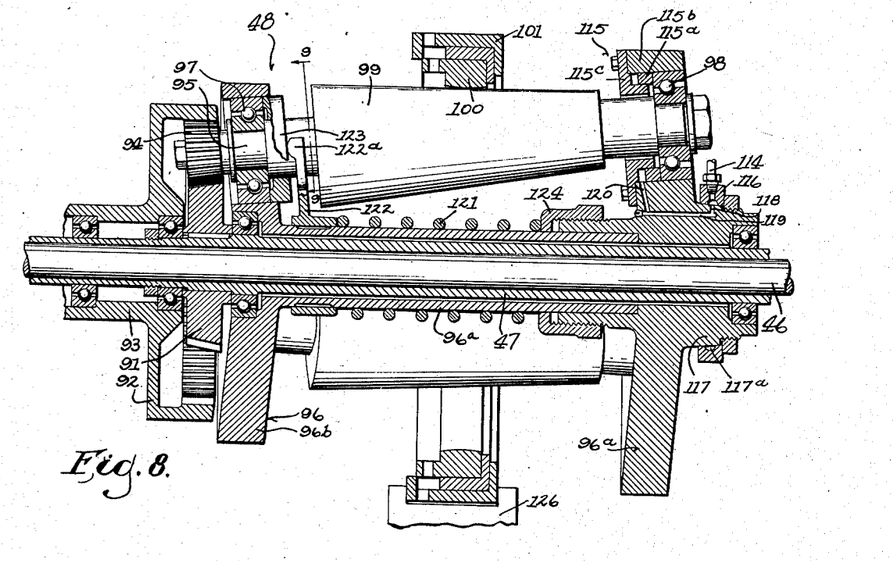
Figure 8 is an enlarged sectional view of a rate change device shown in Fig. 4.
Figure 9:
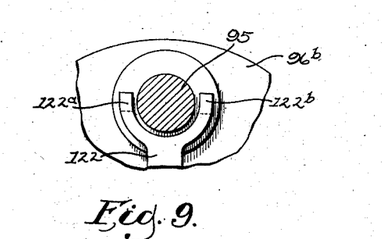
Figure 9 is a partial section taken along line 9—9 of Fig. 8.

The feed train includes the initial gear 31, an idler gear train 42, Fig. 1, a gear 43, a shaft 44, an extensible universal joint shaft device 45, a shaft 46, Figs. 1, 4, a sleeve 47, Figs. 4, 8, rotatably journaled in the housing 23a and slidably splined with shaft 46, a stepless feed rate changer generally denoted by the numeral 48, a torque measuring device generally denoted by the numeral 49, gears 50, 51, and an overrunning clutch device generally denoted by the numeral 52, which may drive the sleeve 32 at a feed rate which is variable according to the adjustment of rate changer 48, but which drives only when the clutch 39 of the quick traverse train is disengaged.

The overrunning clutch 52, Fig. 4, may be of any suitable type, but in this instance is of a well known form which includes an inner member 52a fixed on the sleeve 32, an outer member 52b fixed on or integrally formed with the gear 51, and clutch rollers such as 52c, the inner member having cam surfaces whereby springs, not shown, may operate against the rollers to wedge the rollers for the outer member to drive the inner member except when the inner member is driven at a faster rate than the outer member and in the same direction, as occurs when the clutch 39 of the quick traverse train is engaged. By this arrangement the sleeve 32 is alternatively driven at quick traverse rate or at feed rate accordingly as the clutch 39 is engaged or disengaged, the direction of rotation being the same in either case.

The table 22 may be driven in either direction from the sleeve 32 through a table reverser generally denoted by the numeral 54, Fig. 4, which includes friction clutches 54a, 54b each comprising a set of clutch plates in which the alternate plates are keyed with sleeve 32 and with the extended and enlarged hubs of associated bevel gears 57, 58, whereby an intermediate bevel gear 59 may be driven in opposite directions accordingly as clutch spools 54c, 54d are unitarily axially shifted, by means later described, in the one or the other direction, the clutch spools having an intermediate position in which neither clutch is engaged. Bevel gear 59 is connected to drive a table screw 60, Fig. 3, through a shaft 61 and a bevel gear pair 62, 63, the screw 60 being slidably splined in the bore of gear 63 and engaging a nut 64 fixed in saddle 23. The screw 60 is squared at 60a for application of a crank, not shown, for manual adjustment of the table in either direction.

Figures 5, 6, 7:
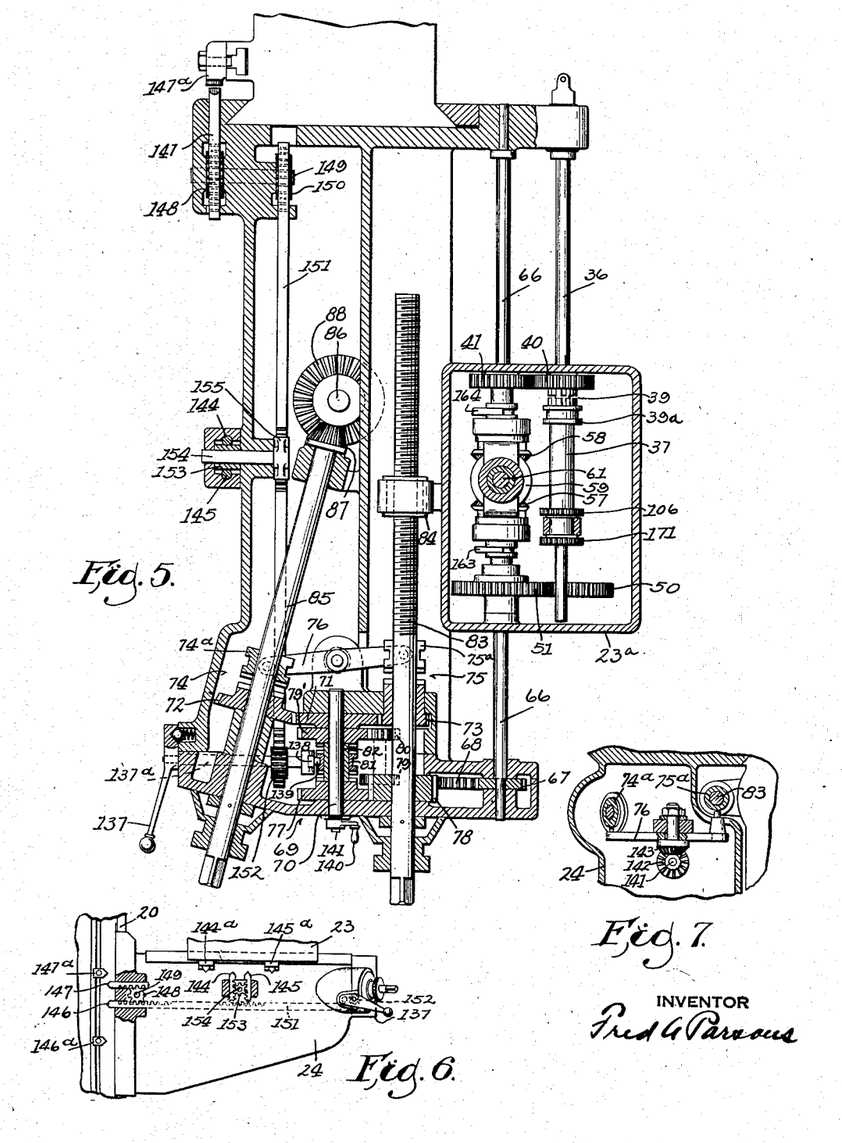
Figure 5 is a section of transmission and control mechanism taken approximately along line 5—5 of Fig. 2, and enlarged.
Figure 6 is a partial left side view, partly in section, of the machine of Fig. 1.
Figure 7 is a partial vertical section showing a portion of the control mechanism of Fig. 5.

Either the saddle 23 or knee 24 may be driven in either direction from sleeve 32, Fig. 4, through a shaft 66, Figs. 4, 5, gears 67, 68, a reverser generally denoted by the numeral 69, a shaft 70, a gear 71 fixed on shaft 70, and gears 72, 73 respectively associated with a knee selector clutch 74 and a saddle selector clutch 75, the selector clutches providing shiftable elements 74a, 75a, Figs. 5, 7, interlocked by a shifter lever 76 in such manner that engagement of the one clutch disengages the other. Reverser 69 includes a gear 77 driven from gear 68 through a gear 78, and a gear 79' driven from gear 78, in a direction opposite to gear 77, through a unitary pair of gears 79, 80, the inner hubs of the gears 77, 79' providing suitable clutch teeth in the usual manner, which can be alternatively engaged by complementary clutch teeth on the opposite ends of a shiftable clutch spool 81, which is slidably splined on a sleeve 82 fixed on the shaft 70, the spool 81 having an intermediate position disengaged from the clutch teeth of both gears 77, 79' whereby to interrupt the power train. The saddle selector clutch member 75a is slidably splined on a saddle feed screw 83 which engages a nut 84 fixed on the housing 23a for saddle cross movement. Knee selector clutch member 74a is slidably splined on a shaft 85 which drives a knee screw 86 through bevel gears 87, 88.

The feed rate changer unit 48, Figs. 4, 8, is similar to the rate changer disclosed in a co-pending application Serial No. 52,095, filed November 29, 1935, and will therefore here be only briefly described. The rate changer includes a driving gear 91 fixed on the sleeve 47, a driven gear 92 fixed on another sleeve 93 which is rotatably mounted on sleeve 47, and gears such as 94 fixed on shafts such as 95, there being several of the gears 94 and shafts 95, preferably three, equiangularly spaced and each simultaneously engaging the driving gear 91 and driven gear 92. The shafts 95 are each journaled in a cage generally denoted by the numeral 96, which is supported for independent rotation coaxial with sleeve 47, the cage including a sleeve portion 96a and flange portions 96b and 96c fixed with sleeve 96a and respectively carrying the bearings for the opposite ends of shafts 95, the bearings in this instance being anti-friction bearings such as 97, 98.

Fixed for rotation or integral with each of shafts 95, Fig. 8, are conically tapered friction rolls such as 99, the axis of the shafts 95 being angularly disposed with respect to the axis of drive sleeve 47, at such angle that the outer periphery of each of the conical rolls stands parallel with the axis of the drive sleeve. Frictionally simultaneously engaging the peripheries of each of the rolls 99 there is a non-rotatable friction ring 100 carried by a frame generally denoted by the numeral 101, the frame together with the ring 99 being adjustable in a path parallel with the axis of the drive sleeve 47, whereby to engage ring 100 with the outer periphery of rolls 99 at various points of different roll diameter, the frame being slidably guided for such movement on spaced guide rods 102, 103, Fig. 3, to be shifted by means later described. Ring 100 is prevented from rotation and carried by frame 101 in a manner permitting of a certain amount of adjustment relative to the frame whereby to simultaneously engage the periphery of each of the friction rolls 99 with equal pressure and at corresponding roll diameters, but since the details of the ring mounting do not concern the present invention they will not here be described.

The friction contact between the rolls 99, Fig. 8, and ring 100 forces each roll and its companion gear 94 to revolve whenever cage 96 is revolved, and at a gear speed determined in part by the diameter of rolls 99 at the point of ring contact. As the ring 100 is axially shifted it contacts rolls 99 at points of differing roll diameter and changes the relative speed of the gears. Thus as the ring is adjusted to engage the smaller diameter of the rolls 99 the speed of the rolls and of the gears 94 increases, and vice versa, and the relationship of the various parts of the rate change device 48 is such that when sleeve 47 is driven at a constant speed the adjustment of ring 100 will enforce a variable speed on driven gear 92. With the parts proportioned as shown in Fig. 8 the speed of driven gear 92 may be any of a stepless series of speeds having a range from zero speed, obtained when ring 100 is engaging a small diameter of rolls 99, to a maximum speed which is somewhat less than the speed of drive shaft 57, depending on the ratio of the driving and driven gears 91, 92, the ratio of the smallest and largest diameters of rolls 99, etc.

Figure 10:
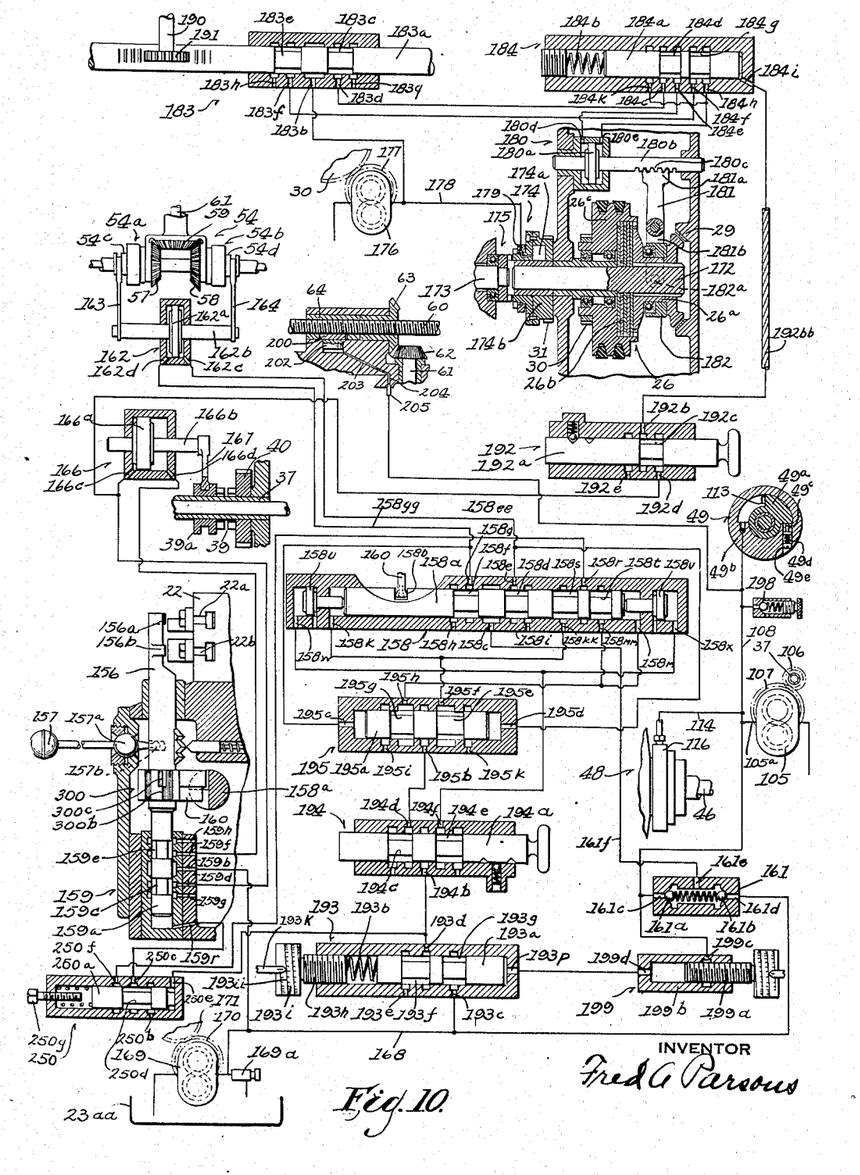
Figure 10 is a diagram showing the construction and operating relationship of certain of the transmission and control mechanism of the machine. It will be understood that in this diagram the various parts are not indicated in any comparable scale.

Means, including the torque measuring device 49, Figs. 4, 10, are provided to automatically regulate the friction pressure between the rolls 99 and ring 100 of the rate changer 48, as follows: The torque measuring device 49 includes relatively rotatable piston and cylinder members 49a, 49b, respectively fixed with the driven sleeve 93 of the rate changer 48 and with the feed train gear 50. Fluid is continuously supplied to the piston 49a from a positive acting pump 105, of any suitable form, driven from the continuously running quick traverse train sleeve 37, as by gears 106, 107, the fluid being carried from the output port 105a of the pump through a channel 108, a stationary coupling member 109, a rotary coupling member 110, an annular groove 110a, and drilled channels 111, 112, in a manner to continuously urge relative rotation of piston and cylinder members 49a, 49b in the direction opposite to that urged by the transmission load carried by the gear 50. Fluid from pump 105 can escape only after the fluid pressure on piston member 49a has rotated the piston member against the resistance of the transmission load sufficiently for exposure of a drain channel 113, the fluid pressure in channel 108 therefore being at all times directly proportional to the torque load on gear 50. To provide a predetermined minimum fluid pressure in the channel 108, for reasons later explained, the piston member 49a of the torque measuring device 49 is continuously urged, in a direction to cover the outlet port 113, by the means of a plunger 49c, the desired minimum fluid pressure being determined by the pressure of a plunger spring 49d, which is adjustable by the means of a spring abutment screw 49e. In addition to other uses, later explained, the device 49 operates as a hydraulic cushioning and shock absorbing device in the mechanical table train.

A pipe channel 114, Figs. 8, 10, connects the variable pressure line 108 to piston devices, such as the piston device 115, respectively associated with the different friction rolls 99. Each of the piston devices 115 includes a piston 115a, operative against the bearings 98 to thrust the bearings, together with the shaft and associated friction roll 99 to the right in Fig. 8, in the direction to increase the friction pressure between the roll and friction ring 100, and includes a cylinder 115b formed in part by the bearing bore in the flange 96c and in part by a cap member 115c fixed on the flange. The fluid supply from channel 114 to piston devices 115 is through a stationary coupling member 116, a rotatable coupling member 117, an annular groove 117a and drilled channels 118, 119, 120.

By the described arrangement the friction pressure between rolls 99 and ring 100 of the rate changer 48 is continuously automatically increased as the feed torque is increased, and vice versa, but to insure that the friction pressure is relieved simultaneously with a reduction in fluid pressure in channels 108, 114 there is provided a spring 121, Fig. 4, continuously urging the rolls 99 in the opposite direction from that urged by pistons 115, the spring operating through a fork member 122 having fork elements such as 122a, 122b bearing against sleeves, such as 123, which abut the various bearings 97, the spring pressure being adjustable by the means of an adjustable abutment nut 124.

For the adjustment of the output speed of the rate changer 48 the ring 100 is axially shifted by mechanism as follows: A shifter fork 126, Figs. 3, 4, engages the frame 101 and is guided on a rotatable cam shaft 127 and a rod 128. Shaft 127 is provided with a cam groove 127a which is engaged by a pivoted follower member 129 carried by the fork 126, the cam shaft being rotatable from a hand wheel 130 fixed on a shaft 131 and connected with the cam shaft by bevel gears 132, 133. A graduated feed dial 134 is rotatably carried on shaft 131 and readable against an indicator 135, the dial preferably being graduated for somewhat less than one revolution thereof to correspond with the range of speeds available from the rate changer 48, which ordinarily requires several revolutions of cam shaft 127 to effect. Reduction gearing is therefore provided between shaft 131 and dial 134, including a pinion 131a, an internal gear 134a, and an idler 136. The cam groove 127a may be of varying angle, as shown, whereby to effect a preferred spacing of the graduations of dial 134 such, for example, as to provide numbered graduations at equal spacing on the dial but corresponding to the terms of a geometrical progression.

For the manual adjustment of the knee and saddle reverser 69, Fig. 5, there is provided a hand lever 137, Figs. 5, 6, fixed on a shaft 137a having also fixed thereon a lever 138 carrying a member 139 engaging a suitable annular groove in the shiftable reverser member 81. The clutches 74, 75 for alternative selection of knee or saddle movement may be manually operated by a hand lever 140, Fig. 5, which is fixed on a shaft 141, Fig. 7, connected by bevel gears 142, 143 to the lever 76, which connects between the shiftable clutch members 74a, 75a. The reverser 69 may also be automatically shifted out of either engaged position by the resulting movement of saddle 23 or knee 24, as the case may be, there being exposed dog operable plungers 144, 145, Fig. 6, for operation by saddle dogs such as adjustable dogs 144a, 145a, and similar exposed plungers 146, 147 for operation by knee dogs such as adjustable dogs 146a, 147a. The dog plungers 146, 147 are connected for alternative movement into the dog zone by a pinion 148, Figs. 5, 6, and connected for disengagement of reverser 69 by a shaft 149, a gear 150, and a rack bar 151 which engages the gear 150 and also engages another gear 152 fixed on the hand lever shaft 137a. The dog plungers 144, 145 are similarly connected for alternative movement into the dog zone by a pinion 153, and connected for reverser disengagement by a shaft 154 and a segment 155 engaging the rack bar 151.

Figure 2:
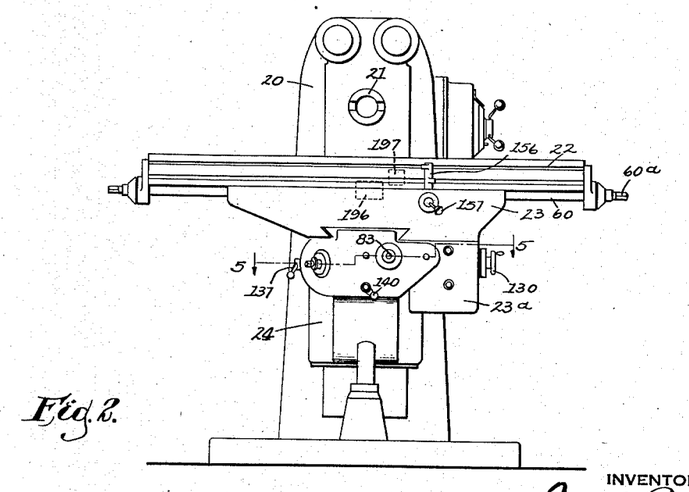
Figure 2 is a front elevation of the same machine.

For the control of longitudinal movement of table 22 a trip post 156, Figs. 2, 10, is mounted for both oscillatory and axial movement adjacent the front longitudinal edge of the table and is shiftable to effect either such movements by a hand lever 157 mounted for universal movement on a ball pivot 157a, the lever connecting for movement of post 156 by the means of an inner extension terminating in a spherical portion 157b which engages a suitable bore in the trip post. Associated with trip post 156 there is a table reverser and interruptor valve device generally denoted by the numeral 158, Fig. 10, and a selector valve device generally denoted by the numeral 159, Fig. 10, for alternative selection of feed or quick traverse rate.

Reverser valve 158, Fig. 10, includes a valve plunger 158a connected for endwise movement from the oscillation of trip post 156 by the means of a lever 160 fixed on the trip post, the lever engaging a slot 158b in the valve plunger. Pressure fluid is continuously supplied to an inlet port 158c of the valve, either from the pressure channel 108, in which the pressure is controlled by the torque measuring device 49 as previously described, or from a constant pressure supply source such as a pressure channel 168 supplied from a pump 169 driven from the constantly running sleeve 37, Fig. 4, by gears 170, 171, the pressure in channel 168 being controlled by an adjustable relief valve 169a of any suitable well known form, the connection of the different pressure lines 108, 168 to the inlet port 158c being through a one-way valve device 161 which includes spring pressed balls 161a, 161b respectively seated to yieldably close the inlet of fluid from ports 161c, 161d, whereby to prevent outlet of fluid while permitting inlet of fluid through either port, the ports being respectively connected with the pressure lines 108 and 168. An outlet port 161e is connected to the inlet port 158c of the reverser valve, through a channel 161f. The valve 161 continuously supplies fluid to port 158c from whichever of the pressure lines 108, 168 is carrying the highest pressure.

The reverser valve 158, Fig. 10, controls the operation of the reverser interruptor 54, there being a reverser piston device generally denoted by the numeral 162 including a piston 162a fixed on a piston rod 162b upon which are also fixed shifter fork members 163, 164 unitarily shiftable and respectively engaging suitable annular grooves in the clutch shifter spools 54c, 54d of the different reverser clutches 54a, 54b. In the one direction of movement of reverser valve 158 the pressure port 158c supplies fluid to a port 162c of piston device 162 through an annular groove 158d, a port 158e and a channel 158ee, whereby to engage the reverser clutch 54b. In the other direction of movement of reverser valve 158 pressure fluid is similarly supplied to port 162d of the piston device through an annular groove 158f, a port 158g and a channel 158gg, whereby to engage the reverser clutch 54a. The movement of valve member 158a to supply fluid pressure to one end of piston 162a, whereby to engage one reverser clutch 54a, 54b connects the other end of the piston 162a to drain through one or the other of the annular grooves 158d, 158f and drain ports 158h, 158i, and in the central position of the reverser valve member 158a, which is the position shown in Fig. 10, both ends of the piston 162a are connected to the drain ports, whereby neither clutch 54a nor 54b is engaged, and movement of the table 22 will stop.

The arrangement described permits the friction clutches 54a, 54b of table reverser 54 to operate at substantially all times under only such pressure as is sufficient to prevent the friction clutches from slipping. Thus, assuming that the selector clutch 39 is in engaged position whereby the quick traverse train is driving the reverser 54 then the torque device 49 will not be driving the table and the pressure in channel 108 will be relatively small as determined by spring 49d. As such times the pressure line 168 will supply pressure fluid through valve 161 and reverser valve 158, for operation of the reverser 54, the pressure in line 168 being controlled by adjustable relief valve 169a to be sufficient to prevent clutch slip during quick traverse operation while permitting some slip at the start of the quick traverse movement to avoid shock. But if selector clutch 39 is disengaged, whereby the feed train is driving reverser 54 through torque device 49, then during any substantial cutting operations the pressure in line 108 will be higher than in line 168 and valve 161 operates to supply fluid from line 108 for operation of the reverser piston device 162 at a pressure which increases according to the feed torque, and vice versa. It is obvious that reverser piston device 162 may, if desired, be supplied at all times from a constant pressure fluid source such as 169 but in that case the pressure controlled by the relief valve, such as 169a must be at all times sufficiently high for the reverser clutches to transmit the intended maximum feed torque load and too high to permit the friction clutches 54a, 54b to act as shock absorbing devices at the start of quick traverse. In such case the valve 161 is not required and channel 168 is connected directly to port 158c. It is also obvious that if the predetermined minimum pressure established, as previously explained, in pressure line 108 by the spring pressed plunger 49c, is sufficiently high, then it will be unnecessary to operate reverser piston device 162 from pressure line 168 during quick traverse movements of the table. In such case, also, the valve 161 would be eliminated but the port 158c of the reverser valve would then be connected directly to the pressure line 108.

The operation of the described control mechanism for reverser 54 is such that as the exposed hand grip portion of lever 157 is swung in one or the other direction about the vertical axis of the lever the reverser 54 is engaged to move the table 22 in the same longitudinal direcion as the hand grip movement, and when the hand lever is centrally positioned the table will stop.

The selector valve 159, Fig. 10, includes a valve member 159a fixed with trip post 156 to form the lower portion thereof. The selector valve controls the operation of the selector clutch 39, Figs. 4, 10, there being a selector piston device generally denoted as 166, which includes a piston 166a fixed on a piston rod 166b upon which is also fixed a shifter fork 167 engaging a suitable annular groove in the shiftable clutch member 39a. Pressure fluid is continuously supplied to an inlet port 159b of valve 159 from any suitable pressure source, such as the pressure line 168 supplied from the pump 169. In the upward movement of post 156 and selector valve member 159a the pressure port 159b supplies fluid to a port 166c of piston device 166 through an annular groove 159c and a port 159d, whereby to shift clutch 39 to its quick traverse position. In the downward movement of the selector valve pressure fluid is similarly supplied to a port 166d of the piston device through an annular groove 159e and a port 159f, whereby to shift clutch 39 to the disengaged position which effects a feed rate as previously explained. The movement of valve member 159a to supply fluid to either port of piston device 166 provides an outlet of fluid from the other end of the piston 166a through the one or the other of the annular grooves 159c, 159e and drain ports 159g or 159h.

The operation of the selector control mechanism just described is such that vertical movement of the exposed hand grip portion of lever 157, Figs. 2, 10, about its horizontal axis effects alternate feed or quick traverse rate of the transmission sleeve 32, whereby to select feed or quick traverse rate for the table, saddle or knee, independently of the operation of the reverser control mechanism previously described.

The main clutch 26 and brake 29, Fig. 10, may be controlled independently of the table transmission reverser and selector controllers, but may also be dependently controlled in accordance with the feed or quick traverse selector whereby to automatically effect a spindle stop during quick traverse movements of the table in any of its several paths, as will now be explained.

The main clutch 26, Fig. 10, includes friction plates such as 26b, the plates being alternately slidably keyed to rotate with a clutch pulley 26c and with a drive shaft 172, which drives an initial shaft 173 of the spindle transmission through a torque measuring device generally denoted as 174, and through a jaw coupling device 175. The torque device 174 includes relatively rotatable annular piston and cylinder members 174a, 174b which are of a construction and operation similar to the corresponding members of the torque device 49 previously described for the feed train and which therefore will not be described in detail. Both the initial feed train gear 31 and the driving jaws of the jaw coupling 175 are fixed with the cylinder member 174b, and the torque device 174 therefore measures the combined torque of the spindle train and feed transmission. Fluid is supplied to the piston of the torque device from a positive pump 176 continuously driven whenever clutch pulley 26b is running, as for instance by a gear 177 engaging with a gear 30, the fluid being supplied to the rotary piston 174a through a pressure channel 178 and a coupling device 179 similar to that used for the torque device 49. As previously explained for the device 49, the pressure in channel 178 varies according to the torque transmitted through the device. In this instance, however, since both the initial spindle drive shaft 173 and the initial feed train gear 31 are driven through the device, the pressure in channel 178 continuously varies in accordance with the total power applied to the machine during any cutting operation.

Clutch 26 and brake 29, Fig. 10, are alternatively shifted into engagement by a piston device generally denoted as 180, which includes a piston 180a fixed on a piston rod 180b which shifts a pivoted lever 181 by the means of a segment 181a engaging rack teeth 180c, the lever having arms such as 181b engaging a shifter ring 182 by the means of suitable trunnions such as 182a, the ring engaging a suitable annular groove in the shiftable clutch hub 26a.

The piston device 180, Fig. 10, is operated by pressure fluid from the variable pressure channel 178 of the torque measuring device 174, the alternative engagement of clutch 26 or brake 29 being primarily controlled by a valve 183 having a movable valve member 183a. Fluid from the channel 178 is supplied to a valve inlet port 183b. In the one direction of movement of valve member 183a the pressure fluid may pass to a port 180d of the piston device through an annular groove 183c, a port 183d and a control valve 184, but only in certain positions of valve 184, as later explained, whereby to engage clutch 26. In the other direction of movement of valve member 183a the pressure fluid passes to the other port 180e of the piston device through an annular groove 183e and a port 183f, and through the control valve 184 whereby to engage brake 29. The control valve 184 includes a movable valve member 184a which is normally urged by a spring 184b to the position shown in Fig. 10 which effects the communication as described from port 183d through port 184c, annular groove 184d, and port 184e to the port 180d, and from the port 183f through port 184f, annular groove 184g, and port 184h to the port 180e. When pressure fluid is admitted by valve 183 to either port of the piston device 180 the pressure in the other port is relieved through the one or the other of the annular grooves 183c or 183e and drain ports 183g, 183h. As a result of the described arrangement the main clutch and brake may be alternatively engaged by the shifting of valve 183 when valve 184 is in the normal position, but valve 184 may be shifted out of the position described to modify the effect of valve 183 as will be later described.

The valve member 183a, Fig. 10, may be manually shifted for control of clutch 26 and brake 29 by a hand lever 185, Fig. 1, connected to the valve member 183a by the means of a shaft 186, a pinion 187, a rack bar 188, a pinion 189, a shaft 190, Figs. 1, 10, and a pinion 191 engaging suitable rack teeth in the valve member.

The clutch 26 and brake 29 may optionally be additionally controlled in accordance with the selection of feed or quick traverse table rate, as follows: A port 184i of valve 184, Fig. 10, is connectible to the quick traverse selecting port 159d of selector valve 159 through a control valve 192 which includes a valve member 192a manually selectively shiftable to different positions. In one position of valve member 192a the port 184i is connected to a drain port 192e through a port 192b and an annular groove 192c, and in such case the operation of clutch 26 and brake 29 is only from control valve 183 and hand lever 185 as previously described. In the other position of valve member 192a, as shown in Fig. 10, the ports 184i, 159d are connected through the port 192b, the annular groove 192c and a port 192d. In the latter case the valve member 184a will be shifted out of its spring pressed position to another position by pressure fluid from port 159d whenever selector valve 159 is shifted to quick traverse position, but will return to normal position whenever valve 159 is in feed position, since port 181i is then connected through port 159d to the drain port 159g. When valve 184 is shifted to said other position, if the valve 183 is then in the position engaging brake 29, whereby clutch 26 is disengaged and spindle 21 is stationary, the spindle will remain stationary because such shifting of valve 184 merely cuts off the pressure applied to the brake through port 184h; but if valve 183 is then in the position engaging clutch 26, the shifting of valve 184 to said other position will immediately disengage clutch 26 and engage brake 29 for so long as selector valve 159 remains in quick traverse position, because in said other position of valve 184 the port 184c, instead of communicating with port 180d of the piston device 180, communicates with port 180e thereof through the annular groove 184d and a port 184k, and at the same time the other port 180d of the piston device 180 is connected to the drain port 183h through the port 184e, the annular groove 184g, the port 184f and annular groove 183e.

By the means of the mechanism just described, assuming that lever 185 and valve 183 are in the position normally engaging the clutch 26, the clutch 26 and brake 29 may nevertheless be controlled to engage the brake whereby to stop the spindle and table feed train whenever selector valve 159 is shifted to quick traverse position, and to again engage the clutch to start the spindle and feed trains when selector valve 159 is next shifted to feed position. But if the lever 185 and valve 183 are in the brake engaging position the shifting of selector valve 159 will not engage the clutch.

Figure 11:
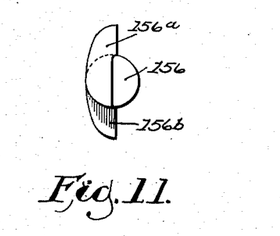
Figures 11, 12 are fragments of certain of the control mechanism shown in Fig. 10.

For the automatic dog control of the reverser valve 158 and selector valve 159, mechanism is provided as follows: The exposed upper end of the trip post 156, Figs. 2, 10, is provided with oppositely extended dog operable ears or portions 156a, 156b, Figs. 10, 11, respectively at different levels to be operated upon by dogs adjustably retained by suitable bolts in the different table slots 22a, 23b. In the intermediate position of rotation of post 156 each of the portions 156a, 156b is positioned outside the zone of dog operation, but in either of the opposite positions of oscillation of the post, which respectively adjust valve 158 to effect opposite directions of table travel as previously explained, one of the portions 156a, 156b will be swung toward the table edge into a position to be operated upon by dogs in the corresponding table slot. Suitable dogs in the one or the other table slot 22a, 22b may then operate upon the adjacent post portion 156a or 156b to raise or lower the post 156, whereby valve 159 effects changes from feed to quick traverse rate or vice versa, as previously explained, or to swing the post on its vertical axis whereby to operate control valve 158. The construction of dogs for raising, lowering and swinging a trip post such as 156 is well understood in the art, and, therefore, the dogs will not be described in detail.

Figure 12:
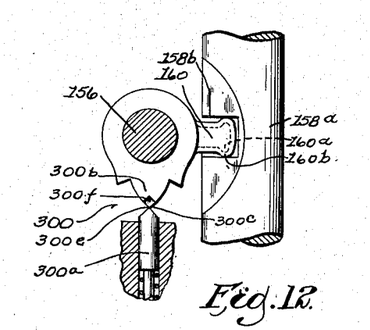

Swinging the trip post 156 on its vertical axis by the means of the table dogs may effect either of two results, namely, to stop the table movement or reverse the direction of the table movement, accordingly as the post is in its feed or quick traverse position. This results from the manner of connection of the trip post to reverser valve 158 and the construction of detent mechanism generally denoted by the numeral 300, Figs. 10, 12. Detent 300 includes a spring pressed cam follower member 300a and two cam portions 300b, 300c respectively co-operative with the follower 300a when the trip post is in its upper or quick traverse position and in its lower or feed position, the cam portion 300b providing a central point 300e, whereby in the upper position of post 156 the detent 300 acts to continue rotation of the trip post immediately it has moved past the center of its movement in either direction, and the cam portion 300c providing a central notch 300f whereby in the lower position of post 156 the detent may retain the post in its central table stop position. The lever 160 which connects trip post 156 to reverser valve 158 also has two portions 160a, 160b respectively engaging the slot 158b in valve member 158a when the trip post is adjusted upwardly to quick traverse position and downwardly to feed position, the lever portion 160a engaging the slot with considerable lost motion, and the lever portion 160b fitting in the slot with substantially no lost motion. By reason of the detent and lever contruction described the reverser valve 158 closely follows the rotation of the post 156 when the post is in lower or feed position and, in such case, during any dog rotation of post 156 for movement of either of the post portions 156a, 156b out of the zone of dog operation the valve member 158a then arrives at its central table stop position at a time when the cam follower 300a is engaged in the central notch 300f of the cam portion 300c, whereby the detent retains the post and valve in table stop position. But in the upper or quick traverse position of the trip post, by reason of the lost motion of the lever portion 160a, the movement of valve member 158a lags behind the post rotation whereby, in either direction of post rotation, the cam follower 300a will have passed over the cam point 300e before the valve member arrives at table stop postion, and before the table can stop the detent 300 operates to further rotate the post and further shift valve member 158a to effect reversal of table movement.

By the mechanism just described the table 22 can be dog controlled to effect a great variety of automatic cycles of table movement including change from feed rate to quick traverse rate or vice versa at any point in either direction of table travel, and including selective stop or reversal at either of both ends of the travel, but with the limitation that the table must be traveling at quick traverse rate when automatic reversal takes place. This limitation is objectionable where the nature of the work does not permit the last portion of the forward movement before reversal to be at quick traverse rate as, for example, where it is necessary to reverse directly out of a forward cutting engagement of the work and cutter. Therefore, to effect table reversal directly from a forward feed rate to a reverse quick traverse rate, other control mechanism is provided as follows:

A pressure responsive valve 193, Fig. 10, includes a shiftable valve member 193a, continuously urged by a spring 193b to a position where a pressure supply port 193c, which is connected to pressure line 168, is blocked, and where another port 193d is connected to a drain port 193e by an annular groove 193f. A port 193p is connected to the pressure line 108 in which the pressure varies according to the feed torque load as previously explained, the connection being made through an adjustable leak valve device generally denoted by the numeral 199 for reasons later explained. At a predetermined pressure in the line 108 the fluid pressure on valve member 193a overcomes the pressure of spring 193b and member 193a is moved to a position in which the pressure port 193c connects with the port 193d through an annular groove 193g. The pressure point in line 108 at which port 193d is connected to the pressure port 193c as described may be selectively predetermined by adjustment of a spring abutment screw 193h which has a head portion 193i providing a graduated chart 193j readable against a fixed indicator pointer 193k. The pointer 193k indicates on the chart the pressure point in line 108 at which pressure fluid is supplied to port 193d, and in any desired units as, for example, in terms of pounds of feeding pressure applied to table 22.

Pressure fluid from port 193d of pressure responsive valve 193, Fig. 10, is connectible to the end portions of reverser valve member 158a, which are enclosed by the valve housing to act as pistons, whereby to effect a shifting of the valve member 158a out of either direction position thereof to the other direction position, the connection being through a valve 194 having a valve member 194a manually shiftable to determine whether the pressure controlled valve 193 shall be operative or inoperative, and through an automatic valve 195 having a valve member 195a shiftable for purposes later described. Valve member 194a has alternative positions, in one of which, for the purpose of effecting automatic table reversal, the port 193d of valve 193 is connected to a port 195b of valve 195 through a port 194b, an annular groove 194c and a port 194d. In the other position of valve 194 the automatic table reverse just mentioned is not obtained, as will be later explained.

The valve member 195a, Fig. 10, is automatically shifted to opposite positions accordingly as the reverser valve 158 is in the one or the other position. This result is effected by enclosing the ends of the valve member 195a to act as pistons and connecting the pressure lines from ports 158g, 158e, reverser valve 158 respectively to a port 195c and a port 195d, whereby the movement of reverser valve 158 to apply pressure to reverser cylinder device 162 will also apply pressure fluid to correspondingly shift valve member 195a. The arrangement is such that, when valve 194 is adjusted to the position for effecting automatic reversal then, in either direction position of reverser valve 158, the valve member 195a is automatically positioned to apply pressure fluid from valve 193 to the end of valve member 158a which will effect a shift of the valve member 158a to the other direction position. Thus, if valve member 158a is in the position in which port 158e is supplying pressure to reverser piston device 162, then valve member 195a is forced to the position in which pressure fluid from port 195b may pass to a port 158k of valve 158 through an annular groove 195e and a port 195f although this will not occur until pressure in line 108 operates the valve 193. Similarly if valve member 158a is in the position in which port 158g is supplying pressure fluid to reverser piston device 162, then valve member 195a is forced to the position in which pressure fluid from port 195b will pass to a port 158m of valve 158 through an annular groove 195g and a port 195h. In either instance, the result is to shift valve 158 to effect reversal but only after the pressure applied to valve 193 from pressure line 108 is in excess of the pressure predetermined by the adjustment of abutment screw 193i. The construction of valve 195 is such that, when one of the ports 158k, 158m is connected to pressure fluid as described the other port is connected to one of drain ports 195i or 195k.

Reversal such as just described should not take place until pressure in line 108 rises above that required for the cutting operation, and in order to effect pressure in line 108 sufficient to operate the valve 193, and to effect table reversal at an exact selected point in the table travel, there is provided an abutment 196, Fig. 2, fixed on saddle 23, which can be contacted by a positive stop dog 197 adjustably fixed to the rear longitudinal table edge. By the means of the mechanism described dogs such as 197 can be used to effect table reversal from a forward feed directly to a reverse quick traverse at the end of either direction of table travel, but if reversal out of a feed rate is necessary at only one end of the table stroke the reversal or a table stop may be effected at the other end of the stroke by the means of dogs operating on the trip post 156 during a forward quick traverse movement, as previously described.

The pressure fluid from port 195b, Fig. 10, which effects automatic reversal, as just described, is also used to substantially simultaneously effect a change from feed to quick traverse rate by the shifting of trip post 156 to its upper position, but it is essential that such quick traverse rate shall not become effective until after the reverser valve member 158a has been shifted past the center in its reversing movement. To effect these results the ports 158k, 158m of valve 158 are respectively connected to the ports 158kk, 158mm whereby one or the other of the latter ports receives pressure fluid at the same time as the corresponding port 158k, 158m. Another port 158r receives pressure fluid from one or the other of ports 158kk, 158mm during the reversing movement of valve member 158a, but only after the valve member 158a has been shifted through its central position in the reversing direction. The bottom end of trip post 156, which forms the valve member 159a is enclosed to act as a piston and during reversal the port 158r is connected thereto through a valve 250 and a port 159r. The valve 250 provides a plunger 250a normally spring pressed to a position connecting 159r to a vent 250b through a port 250c and an annular groove 250d, but during the operation of reversal as just described the plunger 250a is shifted by pressure derived from port 193d of valve 193 through a port 250e to connect the ports 159r and 158r through the port 250c, the annular groove 250d and a port 250f. As soon as the table reversal is completed the valve 250 returns to the position connecting port 159r to vent 250b and the trip post 156 can then be again shifted to its feed position if desired. A screw abutment member 250g may, if desired, be adjusted to prevent the shifting of valve member 250, and in such case reversal will take place as described except that it will not be accompanied by a shift of post 156 to effect quick traverse rate, and the reverse movement will then start at the same rate as the forward movement.

It is sometimes desirable in the operation of the reversing means just described that, at the end of a forward feed movement, the table should be maintained stationary in the position determined by positive stop dog 197, Fig. 1, for a predetermined time interval before reversal into quick traverse rate. To effect this result mechanism is provided as follows: Pressure line 108, Fig. 10, which supplies the engaging pressure for reverser clutches 54a, 54b, is provided with a relief valve 198 which limits the maximum pressure applied to the clutches whereby to permit the reverser 54 to slip while still maintaining the pressure in line 108 sufficiently high for operation of valve 193 to effect automatic reversal as described. The relief valve 198 may be of any suitable well known form and therefore will not be described in detail. The valve 199, which is interposed between line 108 and port 193p of valve 193, provides an adjustable restriction which includes an adjustable member 199a in threaded engagement with the casing 199b. Fluid is supplied from pressure line 108 through a port 199c, and an outlet port 199d is connected to the port 193p. The threads of casing 199b fit closely to the sides of the threads of screw 199a but in the direction from port 199c to port 199d the casing threads are enlarged to provide a spiral path at the outside of the threads and relatively small area, through which the pressure fluid must pass. As a result of this construction fluid will be transmitted to port 193p of valve 193 at a rate determined in part by the adjustment of relief valve 198 but mainly by the position of adjustment of member 199a, which can be adjusted to provide a preferred interval of time, following contact of positive stop dog 197 with its abutment 196, as previously described, before the valve member 193a moves sufficiently to connect the pressure line 168 for the shifting of valve 158 to effect table reversal.

The relief valve 169a, Fig. 10, which limits the pressure operating on reverser clutches 54a, 54b during quick traverse table movements, and the relief valve 198, Fig. 10, which limits the pressure on the same clutches during cutting movements, together provide overload safety devices for the transmission of table 22. The reversing mechanism controlled by valve 193 may also be operated as an overload prevention device by reversing the table when a predetermined table torque is exceeded, the overload torque in such case being determined by the adjustment of spring abutment screw 193h. But during cutting movements it is ordinarily preferable that an overload of the table transmission should operate to disengage the table reverser 54, and that the table should then remain stationary until the operator has corrected the conditions causing the overload. To effect such result mechanism is provided whereby an overload of the table shifts reverser valve member 158a to its central position, disengaging both reverser clutches 54a, 54b whereby to stop the table until the valve is subsequently manually shifted to clutch engaging position by operation of control lever 157. The mechanism is as follows: Piston devices including pistons 158u, 158v are provided at each end of reverser valve member 158a and each having rod portions extending sufficiently to force the member 158a to its central position when pressure fluid is simultaneously applied to the pistons through ports 158w, 158x. In the other manually effected position of valve 194, previously referred to, pressure fluid from port 194a, instead of effecting reversal as previously described, is simultaneously delivered to the ports 158w, 158x, through an annular groove 194e and a port 194f to effect a table stop, but only when the table load transmitted through torque device 49 is sufficient to raise the pressure in line 108 to a point which will operate valve 193.

During the feed rate operation of table 22, and particularly during operations generally known as climb cutting it is very desirable that there should be no lost motion between the screw 60 and nut 64 such as might result in chatter or vibration or permit the cutter to suddenly pull itself into the work at a rate faster than the selected feed rate. To eliminate such lost motion and automatically establish a force opposing axial lost motion between the screw 60 and nut 64 there is provided the following structure: Screw 60 is constructed with threads having side faces at such angle that axial pressure has relatively little tendency to initiate or resist movement of the screw laterally. A portion of the nut is cut away at one side of the nut axis, as at 64b, Fig. 3, and in the space thus provided there is a member 200 which may be acted upon by a piston device generally denoted by the numeral 201, the piston 202 being operated by fluid pressure supplied through channels 203, 204, 205, Figs. 3, 10, from the channel 108, whereby the piston pressure varies in accordance with the feed torque load on the torque device 49 of the feed train. The operation of piston device 201 is to force the screw laterally to a pressure contact acting between both sides of each screw thread and the corresponding both sides of the nut threads, there being clearance at the top and bottom of the threads to permit such engagement, even after wear takes place. Where the parts are properly fitted there is very little lateral movement required and the result is to eliminate all back lash or lost motion and to establish a metal to metal pressure which will rigidly prevent lost motion movement of the screw and nut and which is automatically varied in accordance with the load to be transmitted. Moreover the pressure connection is such that during table movements at quick traverse rate, and during manual table movement from the squared screw end 60a, there is a minimum of lateral pressure.

It is to be understood that the relative position of the transmission and control mechanism may differ materially from that shown for the particular machine which has here been used to illustrate the invention. For this reason the specific location in the machine of some of the control mechanism is not indicated in the drawings. In general it may be stated that the preferred position of the various control mechanism will be such as to provide convenient access for the operator to the manually operable or manually adjustable portions of the controls, while maintaining the mutual interconnections, such as lever, shifters, forks, fluid channels etc. of minimum length.

For the specific form of machine shown in Fig. 1 etc., all of the control devices of Fig. 10, excepting only those directly relating to the clutch 26 and brake 29, are directly housed upon or within the saddle 23 and the dependent box or housing 23a. The lower portion of the housing 23a forms a reservoir 23aa, Fig. 10, from which each of the control pressure fluid pumps 106, 177 draw fluid, and to which all fluid leakage and fluid delivered from the various drain ports of the control valves etc. is returned by gravity. In this particular type of machine, by reason of the relative bodily movement of the control mechanism carried by saddle 23 and the control mechanism for clutch 26 and brake 29, which is carried by the column 20, the channel connection between port 192b of valve 192 and port 184i of valve 184 is formed in part by a flexible tube or pipe 192bb, Figs. 1, 10.

What is claimed is:

1. In a machine tool the combination of a pair of supports relatively movable in a plurality of mutually transverse paths, transmission mechanism for said relative movement, a rate changer providing frictionally engaged rate change elements relatively shiftable to a low speed position, a relatively high speed position and to any intermediate position whereby to mechanically provide a stepless series of speeds, path selector means including a plurality of shiftable reversers respectively for different of said paths, a feed rate train connectible for driving each of said reversers through said frictionally engaged elements, a quick traverse train connectible for driving each of said reversers exclusive of said frictionally engaged elements, a shiftable train selector, and a plurality of independently operable controllers including controllers respectively for shifting different of said reversers, a controller for shifting said train selector and a controller for shifting said frictionally engaged elements.

2. In a machine tool the combination of a pair of supports relatively movable in a plurality of mutually transverse paths, transmission mechanism for said relative movement, a rate changer providing frictionally engaged rate change elements relatively shiftable to a low speed position, a relatively high speed position and to any intermediate position whereby to mechanically provide a stepless series of speeds, path selector means including a plurality of shiftable reversers respectively for different of said paths, and a plurality of controllers including independently operable controllers respectively for shifting different of said reversers and another independently operable controller for shifting said frictionally engaged elements.

3. In a machine tool having a pair of relatively movable supports, the combination of transmission mechanism for said relative movement including a rate changer providing frictionally engaged rate change elements relatively shiftable to a low speed position, a relatively high speed position and to any intermediate position, whereby to mechanically provide a stepless series of speeds, a feed rate train including said rate change elements, a quick traverse rate train excluding said rate change elements, a shiftable reverser, a shiftable selector for alternative connection of said trains to actuate said reverser, and independently operable controllers respectively for effecting shifting of said reverser, said selector and said frictionally engaged elements.

4. In a machine tool the combination of a work support, a relatively movable tool support, a transmission for said relative movement including a mechanical rate changer, a mechanical reverser and a torque responsive device, and means connecting said torque responsive device to effect operation of said reverser at a predetermined minimum torque load on said device.

5. In a machine tool the combination of a work support, a relatively movable tool support, a transmission for said relative movement including a mechanical rate changer, a mechanical reverser and a torque responsive device, means connecting said torque device to effect operation of said reverser following a predetermined minimum torque load on said device, and adjustable means for determining and altering a period of delay between said predetermined torque load and operation of said reverser.

6. In a machine tool the combination of a work support, a relatively movable tool support, transmission mechanism for said relative movement including a mechanical reverser, a mechanical rate changer, a torque responsive device, a feed rate train connectible through said rate changer, a quick traverse rate train connectible to exclude said rate changer, train selector means shiftable for alternatively effecting the connection of different of said trains, means connectible during the connection of said feed train for said torque responsive device to effect operation of said reverser at a predetermined minimum torque load, and means operable during the connection of said quick traverse train for operation of said reverser at a predetermined point in said relative movement.

7. In a machine tool the combination of a work support, a relatively movable tool support, transmission mechanism for said relative movement including a mechanical reverser, a mechanical rate changer, a torque responsive device, a feed rate train connectible through said rate changer, a quick traverse rate train connectible to exclude said rate changer, train selector means shiftable for alternatively effecting the connection of different of said trains, means connectible for said torque responsive device to effect operation of said reverser following a predetermined minimum torque load on said device, and means operable following said predetermined minimum torque load to shift said train selector means to effect the connection of said quick traverse train.

8. In a machine tool the combination of a work support, transmission mechanism for said relative movement including a mechanical reverser, a mechanical rate changer, a torque responsive device, a feed rate train connectible through said rate changer, a quick traverse rate train connectible to exclude said rate changer, train selector means shiftable for alternatively effecting the connection of different of said trains, means connectible for said torque responsive device to effect operation of said reverser following a predetermined minimum torque load on said device, means operable following said predetermined minimum torque load to shift said train selector means to effect the connection of said quick traverse train, and adjustable means for determining and altering a period of delay between said predetermined torque load and said connection of the quick traverse train.

9. In a machine tool the combination of a work support, a relatively movable tool support, transmission mechanism for said relative movement including a mechanical reverser, a mechanical rate changer, a torque responsive device, a feed rate train connectible through said rate changer, a quick traverse rate train connectible to exclude said rate changer, train selector means shiftable for alternatively effecting the connection of different of said trains, means connectible for said torque responsive device to effect operation of said reverser following a predetermined minimum torque load on said device, means normally operable following said predetermined minimum torque load to shift said train selector means to effect the connection of said quick traverse train, and means adjustably associated with said normally operable means and adjustable to prevent said connection of the quick traverse train.

10. In a machine tool the combination of a pair of relatively movable supports, a transmission for said relative movement including a feed rate train, a quick traverse rate train, a train selector shiftable for alternative connection of said trains, and a shiftable reverser, and control mechanism including means for shifting said reverser at a predetermined point in said relative movement and substantially simultaneously shifting said train selector, said control mechanism being alternatively operable to shift said reverser without shifting said train selector.

11. In a machine tool the combination of a rotatable support, another support relatively reciprocable, transmission mechanism for rotation of said rotatable support including a shiftable motion interruptor, a transmission for said relative reciprocation including a reverser and a torque responsive device, means connecting said torque responsive device to effect operation of said reverser following a predetermined minimum torque load on said device, and means operable following said predetermined minimum torque load to effect a shifting of said interruptor.

12. In a machine tool the combination of a rotatable support, another support relatively reciprocable, transmission mechanism for rotation of said rotatable support including a shiftable motion interruptor, a transmission for said relative reciprocation including a reverser, alternatively connectible feed or quick traverse trains and a torque responsive device, means connecting said torque responsive device to effect operation of said reverser following a predetermined minimum torque load on said device, means operable following said minimum torque load to connect said quick traverse train, and means operative substantially simultaneously with said quick traverse train connection to effect a shifting of said interruptor.

13. In a machine tool the combination of a rotatable support and another support relatively movable, transmission mechanism for said rotatable support including a shiftable motion interruptor, a transmission for said relative movement including a torque responsive device, and means connecting said torque responsive device to effect a shifting of said interruptor following a predetermined minimum torque load on said device.

14. In a transmission and control mechanism the combination of a power train including mechanical rate change means and transmission elements providing a fluid chamber therebetween in which the fluid pressure varies in accordance with the load transmitted between the elements, and means interrupting transmission of motion through said train at a predetermined point in said fluid pressure.

15. In a transmission and control mechanism the combination of a power train including mechanical rate change means and transmission elements providing a fluid chamber therebetween in which the fluid pressure varies in accordance with the load transmitted between the elements, said power train also including reversing means, and means for operation of said reversing means at a predetermined point in said fluid pressure.

16. In a transmission and control mechanism the combination of a rate changer providing shiftable rate change elements frictionally engaged, a plurality of branch lines, selector means shiftable for alternative actuation of said branch lines from said rate changer, a torque responsive device driven through said elements in either position of said selector means, and means connecting said torque responsive device in various rate change positions of said elements to increase the pressure engagement thereof as the torque increases and vice versa.

17. In a transmission and control mechanism the combination of a shiftable reverser, a feed rate train including shiftable rate change elements frictionally engaged, a quick traverse rate train, control means shiftable to alternatively connect said feed rate train to actuate said reverser through said frictionally engaged elements or to connect said quick traverse rate train to actuate said reverser, a torque responsive device driven from one of said trains to exclude said reverser, and means connecting said torque responsive device in various positions of said elements to increase the pressure engagement thereof as the torque increases and vice versa.

18. In a machine tool the combination of a pair of relatively movable supports, a rate changer including a pair of rate change elements frictionally engaged and relatively adjustable to a low speed position, a relatively high speed position and to any intermediate position whereby to mechanically provide a stepless series of speeds, a shiftable reverser connected for movement of one of said supports, a feed rate train operable for uni-directional rotation of one of said elements and connectible for driving said reverser through said rate changer, and a quick traverse rate train alternatively connectible to drive said reverser to exclude said rate changer.

FRED A. PARSONS.